Aug. 21, 1945.　　　　G. DOROTHEA　　　　2,383,297
ARTICLE INSPECTING MACHINE
Filed July 28, 1943　　　　5 Sheets-Sheet 1

INVENTOR
GALE DOROTHEA
BY Harold L. Gammons
AGENT

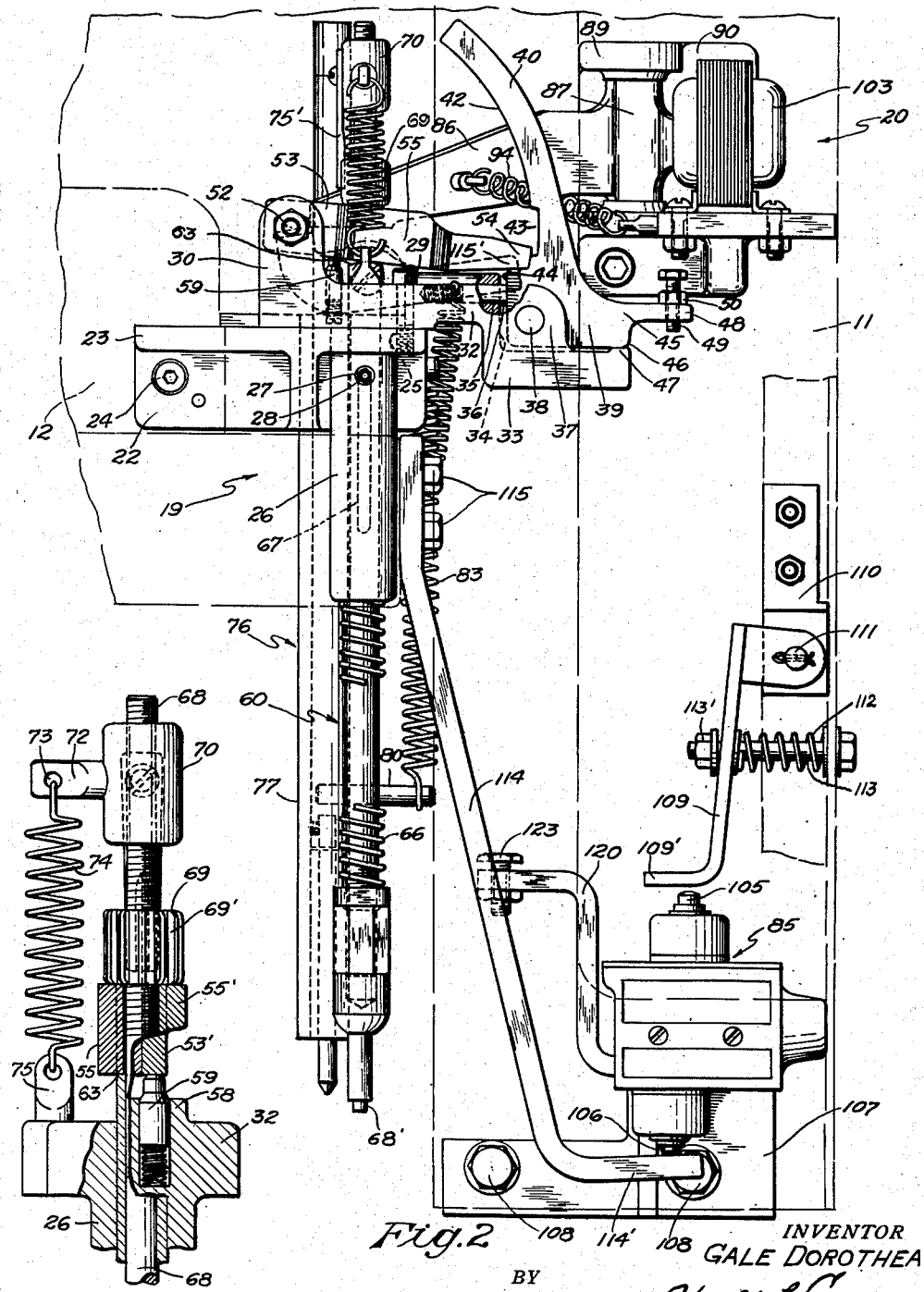

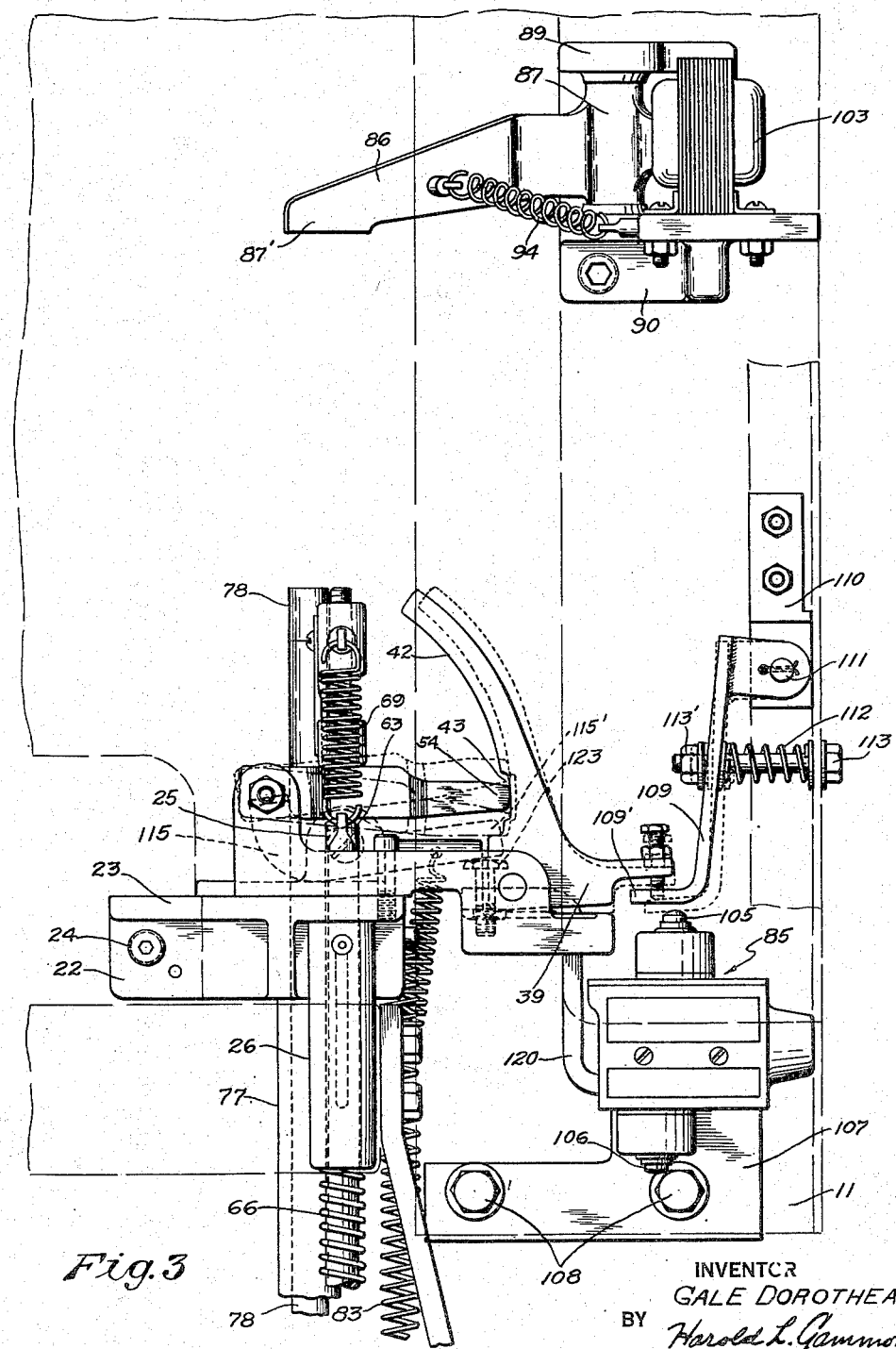

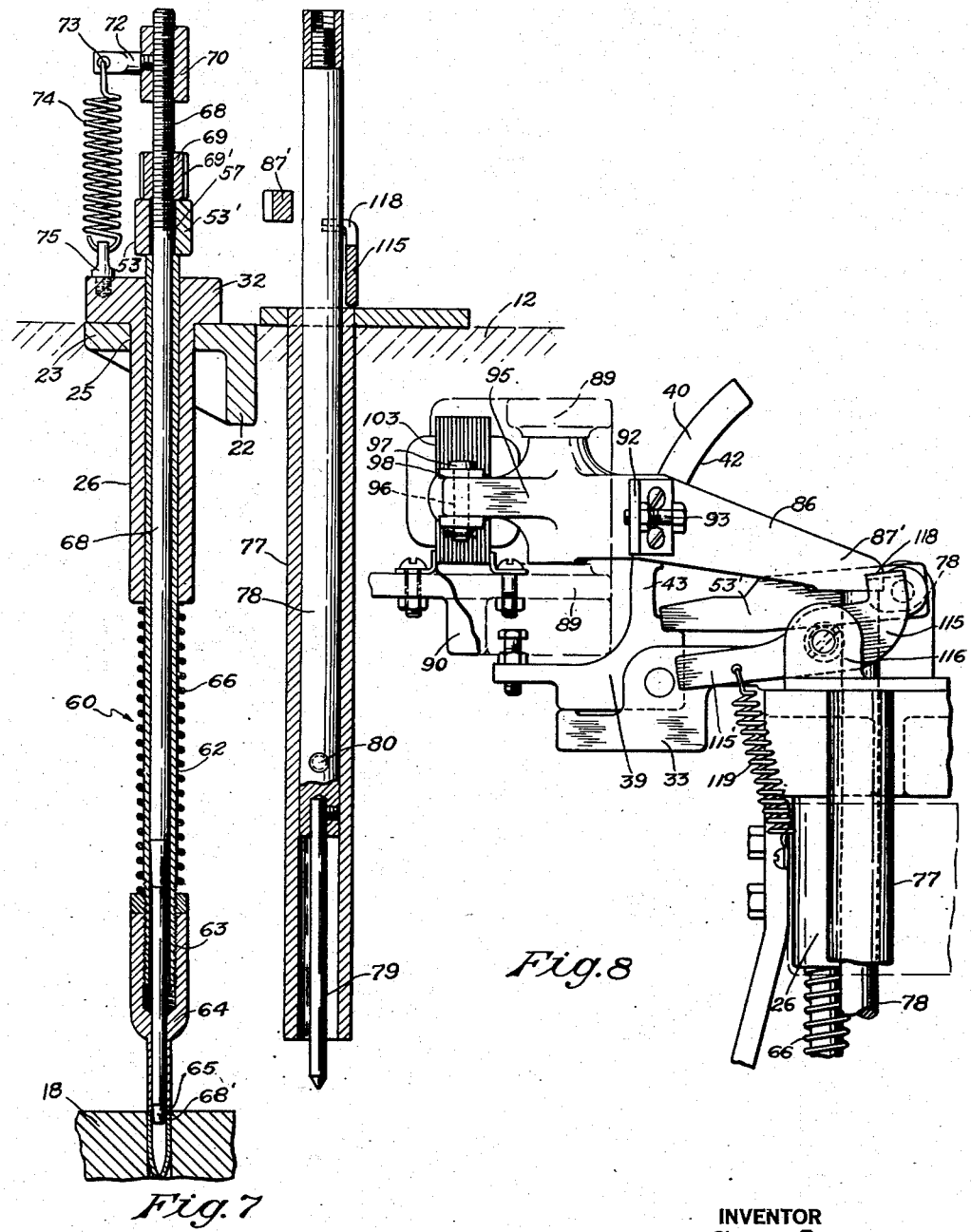

Patented Aug. 21, 1945

2,383,297

UNITED STATES PATENT OFFICE 2,383,297

ARTICLE INSPECTING MACHINE

Gale Dorothea, Bridgeport, Conn., assignor to Remington Arms Company, Inc., Bridgeport, Conn., a corporation of Delaware Application July 28, 1943, Serial No. 496,503

17 Claims. (Cl. 209—88)

The present invention relates, in general, to an article gauging machine, and, in particular, to a mechanism which is adapted to inspect and detect articles of different lengths and improperly oriented articles.

Moreover, the inspection mechanism embodies means to automatically eject those articles which are of improper length or which are inverted without interruption in the inspection of ungauged articles.

It will be understood that the gauging mechanism of this invention may have many applications, but, for the purpose of clarity, only one exemplary embodiment of the invention is described herein and illustrated in the accompanying drawings. This embodiment is particularly adapted to gauge ammunition components such as .30 caliber bullet jackets. However, it will be understood that modifications may be made in the embodiment shown for gauging articles of different materials and configuration.

An object of the invention is to gauge articles of different lengths including inverted articles and eject the inverted articles and those articles which are of improper length without interrupting the inspection of ungauged articles. A further object is to provide means for feeding articles intermittently to an inspection station and to an ejection station and to eject defective or inverted articles at the ejection station while simultaneously inspecting ungauged articles at the inspection station. A still further object is to provide a machine having article supporting means, a reciprocating gate, and article inspection and ejection punches supported on the gate to gauge and eject articles respectively, the article ejection punch being located at a station next succeeding the inspection punch to automatically eject defective or inverted articles from the supporting means which have been gauged by the inspection punch. A still further object is to provide means associated with an article inspection punch and actuated by displacement thereof by a defective or inverted article to cock an ejection punch for ejecting the defective or inverted article without interrupting the continuous operation of the machine. A still further object is to provide means associated with the article inspection punch and ejection punch for automatically restoring these punches to their normal positions.

Other objects, features and advantages of the invention will be more fully described in the following specification.

In the drawings:

Fig. 2 is an enlarged front elevation of the inspection and ejection punches including the ejection punch cocking means, the gate being at the upper end of its stroke.

Fig. 3 is an enlarged fragmentary front elevation of the punch of Fig. 2 when the gate is at the lower end of its stroke.

Fig. 6 is an enlarged fragmentary side elevation partly in section of the inspection punch showing a pair of levers seated on the upper end of the punch, and resilient means for holding the levers in engagement with the punch.

Fig. 7 is a sectional elevation of the inspection and ejection punches on line 7—7 of Fig. 5.

Fig. 8 is a fragmentary side elevation of the punches and ejection punch cocking means in the direction of the arrows 8—8 of Fig. 5.

Figure 1:
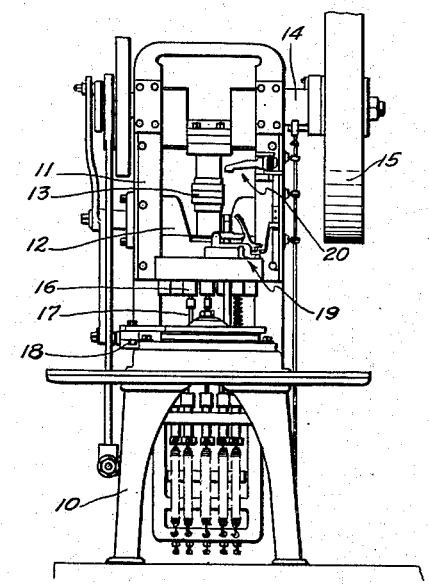
Fig. 1 is a front elevation of a machine especially adapted to embody the device of this invention.

Referring to the drawings, the inspection and ejection punches of this invention are particularly adapted to be used on a bullet jacketing punch press of the type disclosed in Fig. 1 and which comprises a base 10 having a vertical inverted U-shaped frame 11 which carries a gate 12 slidable between ways on the parallel sides of the frame and reciprocated therein by means of a connecting rod 13 which is pivotally connected at its upper end to a crank shaft 14, the latter being driven by a belt and pulley drive, indicated generally at 15. The gate carries a plurality of suitably arranged chucks 16 for holding tools or punches 17. The latter are thus reciprocated in axial alignment with articles, in this instance bullet jackets, carried in circumferentially spaced supporting apertures or blank dies of an intermittently rotated dial 18. For a more detailed description of a press of this general character, reference may be made to the patent of C. R. Richards, No. 493,519, March 14, 1893.

The bullet jacket inspection and ejection mechanism of this invention is indicated generally at 19 and 20 in Fig. 1, the elements 19 being supported on the reciprocating gate 12 and carried to and from cooperative engagement with the elements 20 which are fixedly secured to the frame 11 of the machine.

Referring to Fig. 2, the elements 19 comprise a bracket 22 having a horizontally extending flange 23 and fastened to the gate by suitable bolts 24. The flange 23 is provided with a vertically drilled hole 25 in which is mounted the vertically depending sleeve 26 of a second bracket member, hereinafter described, adapted to fixedly support the sleeve 26 in the hole 25 of the first bracket, as shown in Fig. 7. A radially tapped hole 27 is provided in the sleeve to accommodate a set screw 28 for the purpose described below.

Secured on the upper surface of the flange 23 by a pair of bolts 29 is the second bracket comprising an upstanding arm 30 and a horizontally extending leg 32 provided with a foot 33 formed integrally thereon. The upper horizontal surface of the foot 33 is in a horizontal plane below the horizontal plane of the leg 32 thereby forming a substantially vertical wall or shoulder 34 which is provided with a smooth bore hole 35 drilled in alignment with the longitudinal axis of the leg 32. A spring pressed plunger 36 is shown slidably mounted in the hole 35. A pair of spaced parallel bearing flanges 37 are formed integrally on the foot 33 for supporting the trunnions 38 of a pivoted member or lever 39. The latter is somewhat L-shaped, as shown, having a slightly curved reach 40 provided with a functional edge 42 having a notch 43 and a shoulder 44. The lateral extension 45 of the lever 39 has a knee 46 adapted to engage an anvil 47 formed integrally at the end of the foot 33, the knee 46 being normally held in contact with the anvil 47 by the spring pressed plunger 36 which engages the shoulder 44 of the lever 39. A finger 48 projects from the lateral extension 45 and carries a vertically adjustable screw 49 having a lock nut 50.

Figure 5:
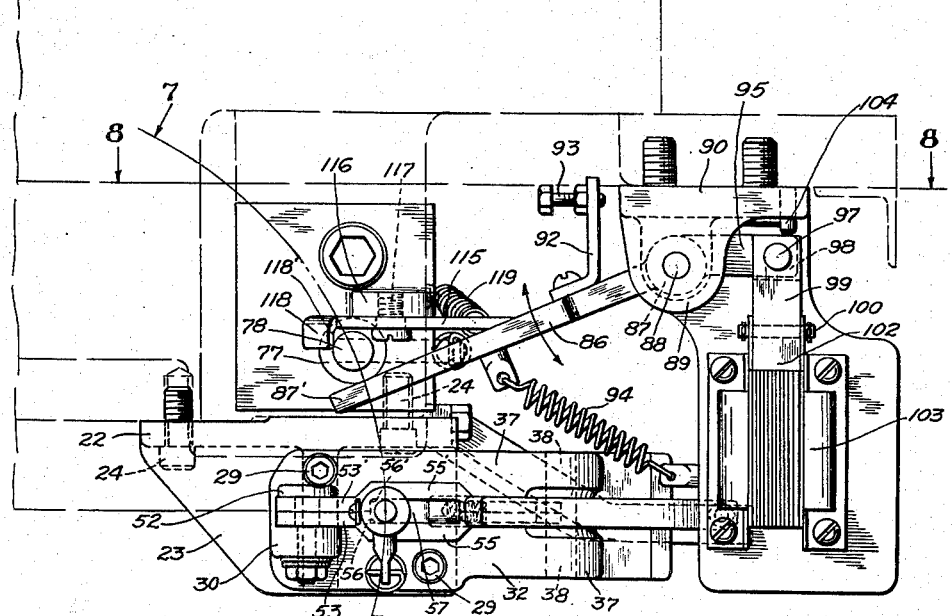
Fig. 5 is an enlarged plan view of the punches and ejection punch cocking means.

Pivotally secured to the upstanding arm 30 of the second bracket by a horizontally disposed pin or bolt 52 are a pair of levers 53 and 53'. Each lever comprises a stiff, flat metal strip of substantially uniform thickness reduced in width at its forward end to provide a nose portion 54 and 54' respectively and bent intermediate its end so as to form a laterally offset portion 55 and 55' respectively which defines a substantially rectangular notch or recess 56 and 56' in each lever, as shown in Fig. 5.

In their assembled position on the upstanding arm 30, the adjacent vertical sides of the levers 53 and 53' are in sliding engagement at their opposite ends while their oppositely disposed recesses 56 and 56' intermediate the ends of the levers cooperate to form a substantially rectangular aperture 57 between the levers. The nose portion 54 and 54' respectively of each lever is, as shown, adapted normally to engage the functional edge 42 of the lever 39 at a point thereon below the recess 43.

Referring to Fig. 6, the leg 32 of the second bracket is shown provided with a boss 58 on its upper surface, the boss 58 being drilled vertically to take a spring pressed plunger 59 which is constructed and arranged to engage the under edge of the lever 53' at a point thereon adjacent its rear end, as shown in Fig. 2. It will be apparent that the lever 53' will thus be constantly urged to pivot upwardly counterclockwise from its normal position.

Suitable gauge means for inspecting bullet jackets in the supporting apertures of the dial 18 comprise a punch indicated generally at 60. The latter comprises a tubular shank 62 adapted particularly to detect long and short jackets. The upper end of the shank is slightly rounded as at 63 and adapted to engage the under edges of the levers 53 and 53' adjacent their offset portions 55 and 55', as shown in Figs. 2 and 6.

The lower end of the shank 62 is threaded externally as at 63 on which end is threadedly secured a nipple 64 having a cylindrical article engaging end 65 of reduced diameter. The shank 62 is slidable vertically within the sleeve 26 and is held in a normal position with relation thereto by the force of a coil compression spring 66, the ends of which engage the shoulders formed by the lower end of the sleeve 26 and the upper end of the nipple 64 respectively. The shank is held from rotating in the sleeve 26 by the set screw 28 which projects into a longitudinal slot 67 in the shank. The set screw also provides means for preventing the shank from being forced out of the sleeve by the spring 66, the set screw being normally adapted to engage the upper closed end of the slot, as shown in Fig. 2.

Slidable within the shank 62 is a second punch comprising a solid rod 68 which is adapted to detect inverted jackets. The rod 68 is reduced in diameter as its lower end 68' to slide freely within the end 65 of the nipple 64 and is threaded at its upper end to carry an adjusting nut 69.

As shown in Fig. 7, the upper end of the rod 68 passes up through the aperture 57 formed between the two levers 53 and 53', the nut 69 being adapted to seat on the upper edges of these levers and thereby to support the rod 68 in the tubular shank 62.

Resilient means are provided for holding these levers 53 and 53' in their normal position of Fig. 2 and comprise a collar 70 which is fastened to the uppermost end of the rod 68 by a stud screw 72, the latter having an eye 73 in which is engaged the upper end of a coil spring 74. The lower end of the spring 74 is fastened to the bracket member 32 by a similar stud screw 75 and provides a force acting to hold the nut 69 in engagement with the upper edges of the levers 53 and 53'.

As shown in Fig. 2, a detent is provided for holding the nut 69 in adjusted position and comprises a resilient finger 75', the upper end of which is fastened to the collar 70 by a suitable screw. The lower end of the detent is adapted to resiliently engage in vertical lands 69' formed in the periphery of the nut 69. The latter thus provides means for fixing the position of the rod 68 with respect to the tubular shank 62 so that the lower end 68' of the rod 68 may be nicely adjusted with respect to the end 65 of the nipple 64.

To illustrate the operation of the levers 53 and 53' when the punches 62 and 68 are carried by the reciprocating gate 12 into inspection relationship with jackets of different lengths or an inverted jacket; let it be assumed that a jacket of normal length has been indexed beneath the inspection punches by the supporting dial 18. By means of the threaded nipple 64 the end of the inspection punch 62 is suitably adjusted with respect to a jacket of normal length so that at the lowermost point in its stroke, the end 65 of the punch lightly engages the jacket and is thereupon moved upwardly a predetermined distance in the sleeve 26 overcoming the restraining force of the springs 66 and 74. Both levers 53 and 53' are thereupon pivoted counterclockwise from their normal positions, as shown in Fig. 2, to their positions shown by the full lines in Fig. 3 which shall be hereinafter referred to as their displaced positions.

The measure of displacement of the levers 53 and 53' will be uniform for jackets of standard length, and, as shown in Fig. 3, is such that the nose portions 54 and 54' of these levers lie opposite the recess 43 in the pivoted lever 39.

When the inspection punch 62 is displaced by engagement with an overlong jacket, then the pair of levers 53 and 53' are pivoted counterclockwise from their normal position to positions of maximum displacement, as indicated by the dotted lines in Fig. 3. In their positions of maximum displacement, the noses of the levers are moved to a point which is above the recess 43 of the lever 39 so as to abut its functional edge 42.

Inasmuch as the inspection punch 62 is adjusted so as to only lightly engage a jacket of standard length when the inspection punch is at the end of its downward stroke, it follows that the inspection punch will not engage a short jacket, and, consequently, the punch 62 will not be moved upwardly within the sleeve 26 and the levers 53 and 53' will thus remain in their normal position, as shown in Fig. 2. In their normal positions, the noses of the levers abut the functional edge 42 of the lever 39 at a point below the recess 43.

Thus, the pair of levers 53 and 53' are moved from their normal position to positions of displacement either opposite the recesses 43 of the lever 39 by jackets of standard length; or in abutting engagement with the functional edge 42 of the lever 39 by an overlong jacket; or remain in their normal position in abutting engagement with the functional edge 42 of the lever 39 when gauging a short jacket.

As indicated in Fig. 7, when the punch 62 has been moved into engagement with a jacket, the punch 68, which is adapted to detect inverted jackets, is ineffective since its end 68' is dimensioned to move freely into the mouth of the jacket. However, when a jacket is inverted whether long, short or of standard length, the end 68' of the inspection punch 68 will engage the point of the jacket and be displaced upwardly within the inspection punch 62, thereby overcoming the tension force of the spring 74 and carrying the adjustable nut 69 up out of engagement with the upper edges of the levers 53 and 53'. The latter are thus freed from the restraining force of the spring 74 whereupon the lever 53' will be displaced upwardly by its spring pressed plunger 59 so that its nose 54' is in a position of maximum displacement abutting the functional edge 42 of the lever 39.

The movement of the lever 53 is dependent as before upon the upward displacement of the inspection punch 62, and, inasmuch as the tubular end 65 of the latter will tend to telescope over the pointed end of an inverted jacket, the punch 62 will remain in its normal position, certainly, when the inverted jacket is short or of standard length. If the inverted jacket is overlong, then the punch 62 may move sufficiently so that the end 54 of the lever 53 will be displaced opposite the recess 43 of the lever 39, but inasmuch as the latter will have been arrested by the lever 53' the displacement of the lever 53 will be of no consequence.

As shown in Fig. 3, the degree of pivotal movement counterclockwise of the lever 39 is determined by the positions of the levers 53 and 53', the lever 39 being held or locked against substantially any movement whatsoever when the noses 54 and 54' of the levers 53 and 53' abut the functional edge 42 of the lever 39. This locked position of the lever 39 will be hereinafter designated as its normal or immobile position. However, when the noses of the levers 53 and 53' are opposite the recess 43, the lever 39 is relatively free to pivot to a predetermined operative position. The term "predetermined operative position" as hereinafter used shall be understood to mean that the lever 39 has been freed to pivot counterclockwise slightly to the position shown by the full lines in Fig. 3.

Both the relatively free movement and the immobility of the lever 39 are utilized to actuate suitable means for automatically ejecting nonstandard and inverted jackets from the supporting dial without interrupting the inspection of jackets by the punches 62 and 68.

Figure 4:
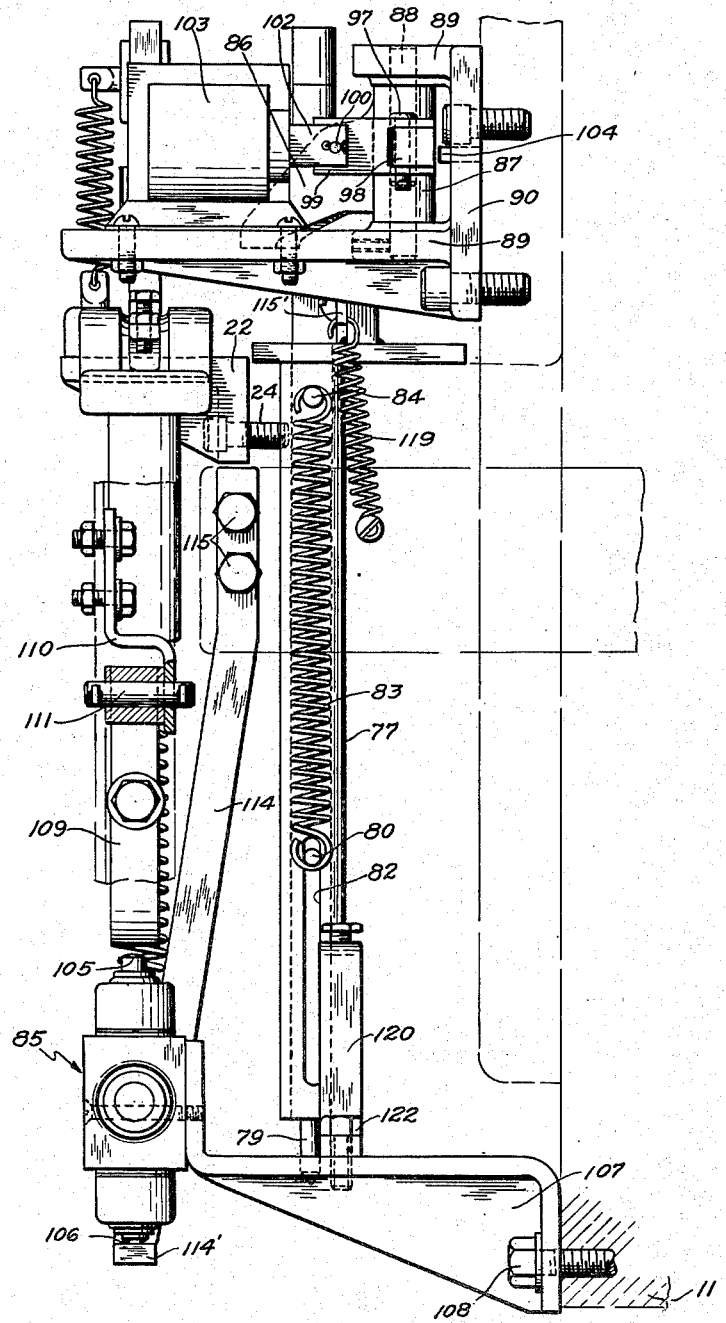
Fig. 4 is an enlarged side elevation of the inspection and ejection punches of Fig. 2.

The ejecting means comprises an ejection punch, indicated generally at 76, and suitable mechanism, indicated generally at 20 in Fig. 1 and hereinafter described, for cocking and releasing the ejection punch. The latter consists of a cylindrical sleeve 77 fastened to and depending vertically from the gate 12 at a point thereon, see Figs. 5 and 7, corresponding to the station next succeeding the inspection station or station at which the jackets are gauged by the inspection punches. Slidable within the sleeve 77 is a rod 78 having an axially aligned feeler 79 suitably secured thereto and extending from its lower end. A pin 80 projects radially from the side of the rod 78 through a longitudinal slot 82 in the sleeve 77, as shown in Figs. 2 and 4, a coil spring 83 being fastened at its lower end to the pin 80 and at its upper end to a pin 84 fixedly secured in the wall of the sleeve 77. The rod 78 is thus resiliently supported in the sleeve 77 in a normal or retracted position but is movable downwardly therein to a cocked position, as hereinafter described, against the tension force of the spring 83.

The mechanism for cocking the ejection punch comprises, in general, a micro-switch, indicated generally at 85, and a solenoid actuated lever 86.

The lever 86 is formed adjacent its rear end with a vertically disposed cylindrical bushing 87 in which is mounted a bearing pin 88, see Fig. 5, supported vertically at its opposite ends between a pair of spaced parallel flanges 89 of a bracket 90 which is bolted to the frame 11 at a point thereon adjacent the upper limit of the stroke of the gate 12. The arm 86 is thus mounted to swing in a horizontal plane, its forward or outer end 87' being adapted to swing clockwise, as shown in Figs. 5 and 8, to a position immediately above the upper end of the ejection punch 78. An arm 92 fastened to and projecting from the arm 86 carries an adjustable screw 93 adapted to engage an edge of the fixed bracket 90 to limit the degree of swing of the arm 86. The lever 86 is held in a normal or inoperative position and is adapted to be reset from its operative position by means of a spring 94 which is connected at one end to the lever 86 and is fastened at its opposite end to a part of the fixed bracket 90.

The rearmost end of the arm 86 constitutes a relatively short arm 95 provided at its outer end with a vertically drilled hole 96 for a pin 97. The latter is adapted to pivotally connect the short arm 95 to the bifurcated end 98 on a connecting link 99 which is pivotally secured at its opposite end by a pivot pin 100 to the outer bifurcated end of a solenoid core 102, as shown in Figs. 4 and 5. The core 102 is slidable within a solenoid, indicated generally at 103, which is suitably secured to the bracket 90 so that the core 102 is movable in a substantially horizontal plane at right angles to the normal position of the short arm 95.

Thus whenever the solenoid 103 is energized, its core 102 will be drawn inwardly pivoting the arm 86 clockwise sufficiently to bring the end 87' of the arm 86 to a position immediately above and in the path of the ejection punch 78. When the solenoid is deenergized, the force of the tensioned spring 94 will return the arm 86 into its normal inoperative position. An adjustable screw, such as shown at 104 in Fig. 5, adapted to engage the short arm 95 may be provided for determining the normal position of the arm 86.

The solenoid 103 is energized and deenergized by means of the switch 85 which is a well known type of micro-switch having a manually operated "on" button 105 and "off" button 106. The switch is supported by a suitable bracket 107 which is fastened to the frame of the machine by a pair of bolts 108, as shown in Figs. 2 and 4, the position of the switch being such relative to the inspection elements carried by the gate that the "on" button 105 is located substantially directly below the adjustable screw 49 of the pivoted lever 39. Moreover, the switch is located adjacent the bottom of the frame, as shown in Fig. 3, so that the button 105 will be actuated by the screw 49 when the gate is at substantially the bottom of its stroke.

Means are provided for actuating the button 105 but only when the latter is subjected to a predetermined force and comprises a lever 109 having a foot 109' at its lower end which extends over the button 105, the lever being supported at its upper end (on the frame 11 of the machine) by means of a bracket 110 and horizontally arranged pivot pin 111. The lever 109 is resiliently held by means of a coil compression spring 112, spring pilot 113 and spring compression adjusting nut 113' so that its foot 109' is disposed in a normal position immediately above the button 105 of the switch 85. The foot 109' may be deflected downwardly from its normal position, shown in full lines in Fig. 3, into engagement with the button 105 of the switch 85 when subjected to a force sufficient to compress the spring 112.

The force required to compress the foot 109' of the lever 109 sufficiently to actuate the button 105 is provided by the reciprocated inspection punch mechanism and in particular by the end of the adjustable screw 49 of the pivoted lever 39. As pointed out above, the pivoted lever 39 is movable from its normal immobile position, as shown in Fig. 2, to a predetermined operative position, as shown by the full lines in Fig. 3, depending upon the length and orientation of the bullet jacket being inspected. When the lever 39 is in its normal immobile position, as shown by the dotted lines in Fig. 3, the screw 49 is adapted to engage the foot 109' of the lever 109 when the gate is at the bottom of the stroke with sufficient force to actuate the button 105 of the switch 85 and thus energize the solenoid 103. From the above description, it will be clear that this takes place whenever the inspection punches detect a short, long or inverted bullet on the down stroke of the gate. Whenever the lever 39 is in its predetermined operative position corresponding to the detection of a jacket of standard length, the resulting relatively free pivotal movement of the lever 39 is sufficient to prevent the screw 49 from exerting sufficient force on the foot of the lever 109 to actuate the button 105 of the switch and the solenoid 103 thus remains deenergized.

Suitable means are provided for actuating the "off" button 106 of the switch each time the gate reaches the top of its stroke and comprise an arm 114 bolted as at 115 to a part of the reciprocating gate and having a foot 114' at its lower end bent so as to engage the button 106 of the switch 85 and deenergize the solenoid whenever the gate reaches the top of its stroke.

Assuming that the inspection punches have been displaced by an overlong or inverted jacket on the down stroke of the gate and that the solenoid has been energized so as to swing the arm 86 clockwise into the path of the ejection punch 78, then, as the gate moves up, the upper end of the ejection punch engages the end 87' of the arm 86 and is stopped thereby from further upward movement, sliding in the sleeve 77 of the gate as the gate moves up to the upper limit of its stroke. The ejection punch 78 will thus be displaced downwardly in the sleeve against the restraining force of the coil spring 83.

Suitable means are provided for locking the ejection punch in its downwardly displaced position, hereinafter referred to as its cocked position, and comprise a latch 115, see Figs. 5 and 8, which is pivotally mounted on a suitable boss 116 of the gate by means of a horizontal pivot pin 117. One end of the latch is bent at substantially right angles so as to form a lip 118 arranged so that its inner edge 118' normally slidingly engages the periphery of the ejection punch 78 and is held in engagement therewith by a coil spring 119 which is secured at one end to the rear end 115' of the latch and at its opposite end to a suitable part of the gate.

Thus, whenever the ejection punch 78 has been moved into its cocked position by engagement with end 87' of the arm 86, the upper end of the punch will have been lowered beneath the lip 118 of the locking latch 115, as shown in Fig. 8, whereupon the lip is freed and springs up over the upper edge of the punch 78 and locks the punch in its cocked position. Consequently, the solenoid 103 may be deenergized when the gate reaches the upper limit of its stroke and the arm 86 drawn out of engagement with the ejection punch 78 by the coil spring 94, and the punch 78 will remain locked in its cocked position and on the return down stroke of the gate will engage and eject the defective jacket through an aperture of the supporting dial.

At the end of the down stroke of the gate, the ejection punch is adapted to be unlocked and reset from its cocked position and to this end a stop is provided in the path of the locking latch to engage the rear end 115' thereof and positively pivot the latch 115 counterclockwise, see Fig. 3, so that its lip 118 will be moved off of the top edge of the ejection punch 78. The stop comprises a Z-shaped bracket 120 bolted to a fixed part of the frame, as at 122, and provided at its opposite end with an adjustable anvil 123. The latter is shown arranged substantially directly beneath and in the path of the rear end 115' of the locking latch 115 so that whenever the gate reaches the bottom of its stroke, the end 115' of the latch strikes the fixed anvil 123, thereby uncocking the ejection punch which is immediately returned to its normal inoperative position by the force of the tensioned spring 83.

The operation of the inspection and ejection mechanism and resetting mechanism is believed to be clear from the above description, but briefly is as follows: When a bullet jacket of normal length is indexed beneath the inspection punches and the gate moves down, the punch 62 is moved upwardly in its sleeve thereby elevating the ends 54 and 54' of the levers 53 and 53' respectively opposite the recess 43 of the lever 39 so that the latter has relatively free pivotal movement. Consequently, when the adjustable screw 49 of the lever 39 engages the foot 109' of the lever 109, the screw 49 is unable to exert sufficient force to actuate the button 105 of the switch 55. The ejection punch 78 remains, therefore, uncocked in its inoperative position and the jacket is enabled to pass through the machine. However, when a long, short or inverted jacket is detected by the inspection punches on the down stroke of the gate, the ends 54 and 54' of the levers 53 and 53' engage the functional edge 42 of the pivoted lever 39 so that the latter is momentarily held in its immobile or normal position. The screw 49 is then enabled to exert sufficient force on the shoe 109' to actuate the button 105 of the switch 85 and to energize the solenoid 103, whereupon the arm 86 is swung over into the path of the upwardly moving ejection punch 78. The latter is thereupon cocked and locked in its cocked position by the latch 115 when the gate reaches the top of its stroke. At the top of the stroke the solenoid is deenergized and the arm 86 reset by spring 94. On the subsequent down stroke of the gate, the ejection punch engages the defective jacket which, in the interim, has been indexed by the dial from the inspection station to the ejection station and pushes the jacket out of the dial aperture. The ejection punch is then unlocked when the end 115' of the latch 115 strikes the anvil 123 and reset by means of its coiled spring 83. It will be clear, of course, that during the ejection of the defective jacket, the inspection punches are gauging the next jacket, and, if the latter is found to be defective, the arm 86 will again be moved into position to recock the ejection punch as the gate moves upwardly. Thus the automatic inspection and ejection of the jackets continues uninterruptedly during the continuous operation of the machine.

What is claimed is:

1. In a machine, article inspection means comprising a punch for gauging articles of different lengths; an element constructed and arranged to be held continuously in engagement with said punch, said element being in a normal position corresponding to the position of said punch when in engagement with a short article and adapted to be displaced from said normal position by said punch whenever said punch engages an overlong article; a member movable with said punch and said element, said member being constructed and arranged to be positively held in a normal immobile position relatively to said punch by engagement with said element in both its normal and displaced positions; article ejection means; and means adapted to be engaged by said movable member to energize said ejection means whenever said member is positively held in said immobile position.

2. In a machine, article inspection means comprising a punch for gauging articles of different lengths; an element constructed and arranged to be held continuously in engagement with said punch, said element being in a normal position corresponding to the position of said punch when in engagement with a short article and adapted to be displaced from said normal position by said punch to predetermined positions corresponding respectively to displacement of said punch when in engagement with an overlong article and an article of standard length; a member movable with said punch and said element, said member being constructed and arranged to be positively held in a normal immobile position relatively to said punch by engagement with said element when in both its normal position and in the predetermined position corresponding to the displacement of said punch by an overlong article, and to be released when said element is in the predetermined position corresponding to the displacement of said punch by an article of standard length; article ejection means; and an ejection means energizing device adapted to be engaged by said movable member and displaced thereby to energize said ejection means when said movable member is positively held in its immobile position and to resist displacement by said member when the latter is released thereby to prevent energization of said ejection means.

3. In a machine, article inspection means comprising a punch for gauging articles of different lengths; a lever in engagement with said punch; resilient means for holding said lever continuously in engagement with said punch in a normal position corresponding to the position of said punch when in engagement with a short article, said lever being adapted to be displaced from said normal position by said punch whenever said punch engages an overlong article; a second lever movable with said punch and said first lever, said second lever being constructed and arranged to be positively held in a normal immobile position relatively to said punch by engagement with said first lever in both its normal and displaced positions; article ejection means; and means adapted to be engaged by said second lever to energize said ejection means whenever said second lever is positively held in its immobile position.

4. In a machine, article inspection means comprising a punch for gauging articles of different lengths; a lever constructed and arranged to be held continuously in engagement with said punch, said lever being in a normal position corresponding to the position of said punch when in engagement with a short article and adapted to be displaced from said normal position by said punch whenever said punch engages an overlong article; a second lever movable with said punch and said first lever, said second lever being constructed and arranged to be positively held in a normal immobile position relatively to said punch by engagement with said first lever in both its normal and displaced positions; article ejection means comprising a solenoid actuated punch; and means comprising a switch adapted to be engaged by said second lever to energize said solenoid whenever said second lever is positively held in its immobile position.

5. In a machine, article inspection means comprising a punch for gauging articles of different lengths; a lever spring biased to be held continuously in engagement with said punch, said lever being in a normal position corresponding to the position of said punch when in engagement with a short article and adapted to be displaced from said normal position by said punch whenever said punch engages an overlong article; a second lever movable with said punch and said first lever and displaceable from an immobile position relatively to said punch to a predetermined operative position, said second lever being positively held in its immobile position by engagement with said first lever in both its normal and displaced positions; an adjustable element on said second lever; resilient means in engagement with said second lever to releasably hold the latter in its immobile position when out of engagement with said first lever; article ejection means; and a switch adapted to be engaged by said adjustable element when said second lever is positively held in its immobile position to actuate said switch and energize said ejection means.

6. In a machine for inspecting articles, the combination with a frame, a gate movable with respect to said frame, and article supporting means; of a punch slidably mounted on said gate for gauging articles of different lengths on said supporting means; a lever pivotally supported on said gate and constructed and arranged to be held continuously in engagement with said punch, said lever being in a normal position corresponding to the position of said punch when in engagement with a short article and adapted to be displaced from said normal position by said punch whenever said punch engages an overlong article; a second lever pivotally supported on said gate and movable with the punch and said first lever, said second lever being constructed and arranged to be positively held in a normal immobile position relatively to said punch by engagement with said first lever in both its normal and displaced positions; article ejection means carried by said gate; and means fixed to said frame and adapted to be engaged by said second lever to actuate said ejection means whenever said second lever is positively held in its immobile position.

7. In a machine for inspecting articles, the combination with a frame, a gate movable with respect to said frame, and article supporting means; of a punch slidably mounted on said gate for gauging articles of different lengths; a pair of levers pivotally supported on said gate in engagement with said punch, each lever being in a normal position corresponding to the position of said punch when in engagement with a short article and adapted to be displaced from its normal position whenever said punch engages an overlong article; resilient means for holding said pair of levers in their normal positions; a third lever pivotally supported on said gate and movable with respect to said pair of levers, said third lever being held at a normal immobile position by engagement with said pair of levers in both their normal and displaced positions; article ejecting means carried by said gate; a solenoid actuated lever pivoted to said frame and adapted to engage said ejecting punch and move it into cocked position; and a switch fixed to said frame adapted to be engaged by said solenoid whenever said third lever is held in its immobile position.

8. In a machine for inspecting articles, the combination with a frame, a gate movable relative to said frame, and article supporting means; of a punch slidable on said gate for gauging articles of different lengths; a pair of levers pivotally supported on said gate in engagement with said punch, each lever being in a normal position corresponding to the position of said punch when in engagement with a short article and adapted to be displaced from its normal position to predetermined positions corresponding respectively to the displacement of said punch by engagement with an overlong article and an article of standard length; a third lever pivotally supported on said gate and movable with respect to said pair of levers, said third lever being held in a normal immobile position by engagement with said pair of levers when in both their normal positions and their predetermined positions corresponding to the displacement of said punch by an overlong article, the pivotal movement of said third lever being relatively free when said pair of levers are in their predetermined positions corresponding to the displacement of said punch by an article of standard length; an article ejection punch carried on said gate; a solenoid actuated lever pivotally supported on said frame and adapted to engage said ejection punch and move it into cocked position; and a switch fixed to said frame adapted to be engaged by said third lever and displaced thereby to energize said solenoid when said third lever is held in its immobile position, and to resist displacement by said third lever when the latter is relatively free thereby to prevent energization of said solenoid.

9. In a machine for inspecting articles, the combination with a frame, a gate reciprocable on said frame, and article supporting means; of a resiliently mounted punch slidable on said gate for gauging articles of different lengths; a pair of levers pivotally supported on said gate in engagement with said punch; resilient means for holding each lever in a normal position corresponding to the position of said punch when in engagement with a short article, each lever being adapted to be displaced from its normal position to predetermined positions corresponding respectively to the displacement of said punch by engagement with an overlong article and an article of standard length; and a third lever pivotally supported on said gate and movable with respect to said pair of levers, said third lever being held in a normal immobile position by engagement with said pair of levers when in their normal positions and in their predetermined positions corresponding to the displacement of said punch by an overlong article, the pivotal movement of said third lever being relatively free when said pair of levers are in their predetermined positions, corresponding to the displacement of said punch by an article of standard length; resilient means in engagement with said third lever to hold it in its immobile position; an article ejection punch carried by said gate; a solenoid actuated lever pivotally supported on said frame and adapted to engage said ejection punch to move it into cocked position; and a switch fixed to said frame to be engaged by said third lever and displaced thereby to energize said solenoid when said third lever is held in its immobile position, and to resist displacement by said third lever when the latter is relatively free thereby to prevent energization of said solenoid.

10. In a machine, article inspection means comprising a punch for gauging articles of different lengths; a second punch slidably supported on said first punch for detecting inverted articles; an element in engagement with said first punch, said element being in a normal position corresponding to the position of said first punch when in engagement with a short article and adapted to be displaced from said normal position whenever said first punch engages an overlong article; means carried by said second punch for holding said element in its normal position and adapted to release said element whenever said second punch engages an inverted article; resilient means in engagement with said element to displace said element when released from its normal position; a member movable with respect to said element, said member being held in a normal immobile position by engagement with said element in both its normal and displaced positions; article ejection means; and means adapted to be engaged by said movable member to energize said ejection means whenever said member is held in its immobile position.

11. In a machine, article inspection means comprising a punch for gauging articles of different lengths; a second punch slidable in said first punch for detecting inverted articles; a pair of levers in engagement with said first punch, each lever being in a normal position corresponding to the position of said first punch when in engagement with a short article and adapted to be displaced from said normal position whenever said first punch engages an overlong article; resilient means carried by said second punch for holding said pair of levers in their normal positions and adapted to release said levers whenever said second punch engages an inverted article; resilient means in engagement with one of said levers to displace said lever when released from its normal position by said second punch; a third lever movable with respect to said pair of levers, said third lever being held in a normal immobile position both when engaged by said levers when in their normal positions and when said resiliently engaged lever is in its displaced position; article ejection means; and means adapted to be engaged by said third lever to energize said ejection means whenever said third lever is held in its immobile position.

12. In a machine for inspecting articles, a spring mounted inspection punch for gauging articles of different lengths; a second inspection punch slidable within said first punch for detecting inverted articles; means for supporting said second punch in said first punch; a pair of levers pivotally supported in engagement with said first punch, each lever being in a normal position corresponding to the position of said first punch when in engagement with a short article and adapted to be displaced from said normal position whenever said first punch engages an overlong article; resilient means including a collar carried by said second punch to hold said pair of levers in their normal positions and adapted to release said levers whenever said second punch engages an inverted article; resilient means in engagement with the second of said pair of levers to displace said second lever when released from its normal position by said collar; a third lever movable with respect to said first and second levers, said third lever being held in a normal immobile position by engagement with said first and second levers both when in their normal position and when said second lever is in its displaced position; article ejection means comprising a solenoid actuated punch; and means comprising a switch adapted to be engaged by said third lever to energize said solenoid whenever said third lever is held in its immobile position.

13. In a machine for inspecting articles, the combination with a frame, a gate reciprocable with respect to said frame, and article supporting means; of a punch slidably supported on said gate to gauge articles of different lengths in said supporting means; a second punch slidably supported in the first punch to detect inverted articles in said supporting means; an element carried on said gate in engagement with said first punch, said element being in a normal position corresponding to the position of said first punch when in engagement with a short article in said supporting means and adapted to be displaced from said normal position whenever said first punch engages an overlong article; means carried by said second punch to hold said element in its normal position and adapted to release said element whenever said second punch engages an inverted article; resilient means supported on said gate in engagement with said element to displace said element when released from its normal position; a member pivotally supported on said gate and movable with respect to said element, said member being held in a normal immobile position by engagement with said element in both its normal and displaced positions; article ejection means carried by the gate; and means on said frame adapted to be engaged by said movable member to energize said ejection means whenever said member is held in its immobile position.

14. In a machine for inspecting articles, the combination with a frame, a gate reciprocatingly mounted on said frame, and article supporting means; of a punch slidably mounted on said gate to gauge articles on said supporting means; a second punch slidably mounted on said gate and adapted to be cocked in locked relation thereto to eject defective articles from said supporting means; means supported on said frame to cock said ejection punch; and means carried by said gate and actuated by said gauging punch to energize said cocking means.

15. In a machine for inspecting articles, the combination with a frame, a gate reciprocatingly mounted on said frame, and article supporting means; of a punch slidably mounted on said gate to gauge articles on said supporting means; a second punch slidably mounted on said gate and adapted to be cocked in locked relation thereto to eject defective articles from said supporting means; an ejection punch engaging member pivotally supported on said frame to move said punch into cocked position; electrically energized means to move said member into engagement with said ejection punch; means to lock said ejection punch in cocked position; and a switch on said frame adapted to be actuated by displacement of said gauging punch to energize said electrically energized means.

16. In a machine for inspecting articles, the combination with a frame, a gate reciprocatingly mounted on said frame, and article supporting means; of a punch slidably mounted on said gate to gauge articles on said supporting means; a second punch slidably mounted on said gate and adapted to be locked thereto to eject defective articles from said supporting means; resilient means to hold said ejection punch in inoperative position; an arm pivotally supported on said frame and adapted to engage said ejection punch to move said punch into article ejecting position; a solenoid connected to said arm to move said arm into engagement with said ejection punch; a lever pivotally supported on said gate and resiliently urged to lock said ejection punch in article ejecting position; and a switch on said frame adapted to be actuated on detection by said gauging punch of a defective article to energize said solenoid.

17. In a machine for inspecting articles, the combination with a frame, a gate reciprocatingly mounted on said frame, and article supporting means; of a punch slidably mounted on said gate to gauge articles on said supporting means; a second punch slidably mounted on said gate and adapted to be locked thereto to eject defective articles from said supporting means; resilient means to hold said ejection punch in inoperative position; an arm pivotally supported on said frame and adapted to engage said ejection punch to move said punch into article ejecting position; a solenoid connected to said arm to move said arm into engagement with said ejection punch; a lever pivotally supported on said gate and resiliently urged to lock said ejection punch in article ejecting position; a switch on said frame; and a lever carried by said gate adapted on detection by said inspection punch of a defective article to engage and actuate said switch and thereby to energize said solenoid.

GALE DOROTHEA.